Aug. 11, 1970    ATUTOSI OKAMOTO ETAL    3,523,713
ANTISKID APPARATUS EQUIPPED WITH VACUUM-TYPE DOUBLE BRAKE DEVICE
Filed Jan. 15, 1968                4 Sheets-Sheet 1

INVENTOR
Atutosi Okamoto
Koichi Taniguchi

BY Cushman, Darby & Cushman
ATTORNEYS

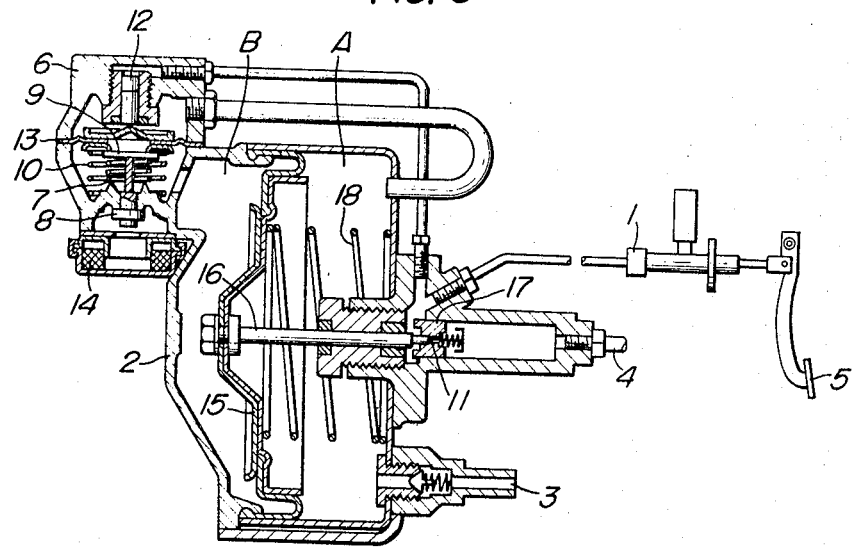
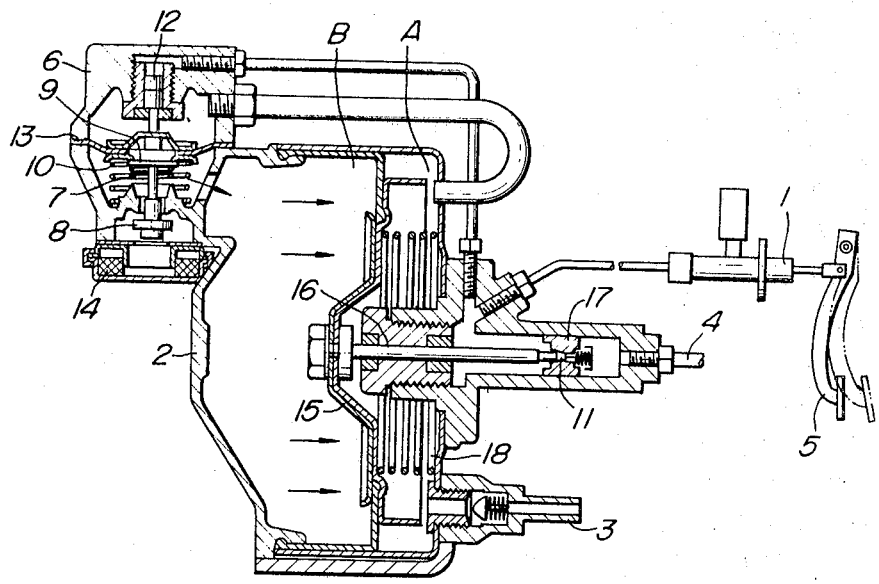

INVENTORS
Atutosi Okamoto
Koichi Taniguchi

BY Cushman, Darby & Cushman
ATTORNEYS

United States Patent Office 3,523,713
Patented Aug. 11, 1970

3,523,713
ANTISKID APPARATUS EQUIPPED WITH VACUUM-TYPE DOUBLE BRAKE DEVICE
Atutosi Okamoto, Toyohashi-shi, and Koichi Taniguchi, Kariya-shi, Japan, assignors to Nippon Denso Company Limited, Kariya-shi, Japan, a corporation of Japan
Filed Jan. 15, 1968, Ser. No. 697,781
Claims priority, application Japan, Jan. 18, 1967, 42/3486/67, 42/3487/67
Int. Cl. B60t 8/08
U.S. Cl. 303—21          3 Claims

ABSTRACT OF THE DISCLOSURE

An antiskid apparatus for an automotive vehicle, which is equipped with a vacuum-type hydraulic brake pressure booster and in which a solenoid-operated changeover valve is disposed in a hydraulic pressure supply conduit connecting a master cylinder with the vacuum-type hydraulic brake pressure booster, said solenoid-operated changeover valve being provided with a release cylinder in communication therewith for relieving the hydraudic pressure in said vacuum-type hydraulic brake pressure booster and wheel cylinders, and the air pressure in said vacuum-type hydraulic brake pressure booster is controlled by the hydraulic pressure developed in said master cylinder or the electromagnetic force of an electromagnet, said solenoid-operated changeover valve and said electromagnet being actuated by an output voltage of a wheel deceleration detector.

BACKGROUND OF THE INVENTION

Field of the invention

The present invention relates to an antiskid apparatus for an automotive vehicle, which is equipped with a vacuum-type hydraulic brake pressure booster.

Description of the prior art

Conventional hydraulic brake apparatus used in an automotive vehicle has experimentally incorporated an antiskid device employing vacuum servo means as a hydraulic brake pressure modulator and has also employed vacuum servo means as a vacuum-type hydraulic brake pressure booster independent of the antiskid device. An antiskid apparatus of the type which is equipped with a vacuum-type hydraulic brake pressure booster and in which the hydraulic pressures for the hydraulic brake pressure boosting operation and the antiskid operation are controlled by a single vacuum servo means has not yet been made available. With the increasing demand for safety in automotive vehicles in recent years, more importance has been attached to antiskid devices which are designed to prevent an automotive vehicle from running with its wheels locked. On the other hand, with the increasing popularity of high speed automotive vehicles, there has been a trend toward using disc brakes which exhibit excellent braking efficiency at high speeds, and accordingly a vacuum-type hydraulic brake pressure booster is being increasingly used in passenger cars along with disc brakes. Under such circumstances, it will be obvious that an antiskid apparatus of the type in which the operation of a vacuum-type hydraulic brake pressure amplifier and the operation of an antiskid device can be controlled by a single and common servo means would be of great advantage in reducing in size and weight the component parts of an automotive vehicle. In this respect, the prior art apparatus in which the hydraulic pressures for operating the hydraulic brake pressure booster and the antiskid device are controlled by two independent vacuum servo means of slightly different constructions, as described previously, are unsatisfactory in that two vacuum servo means must be provided in each automotive vehicle, and therefore are highly disadvantageous from the standpoint of cost and high speed performance.

SUMMARY OF THE INVENTION

In order to solve the aforementioned problems of the prior art apparatus, the present invention contemplates the provision of an antiskid apparatus equipped with a vacuum-type hydraulic brake pressure booster in which the hydraulic pressures for operating the vacuum-type hydraulic brake pressure booster and an antiskid device are controlled by a single vacuum servo means, and which therefore is superior to the conventional apparatus in respect of both cost and high speed performance.

BRIEF DESCRIPTION OF THE DRAWINGS

FIG. 3 and 4 are a set of side elevational views, partly in section, for the illustration of the operation of a conventional vacuum-type hydraulic brake booster;

DESCRIPTION OF THE PREFERRED EMBODIMENTS

Figure 1:
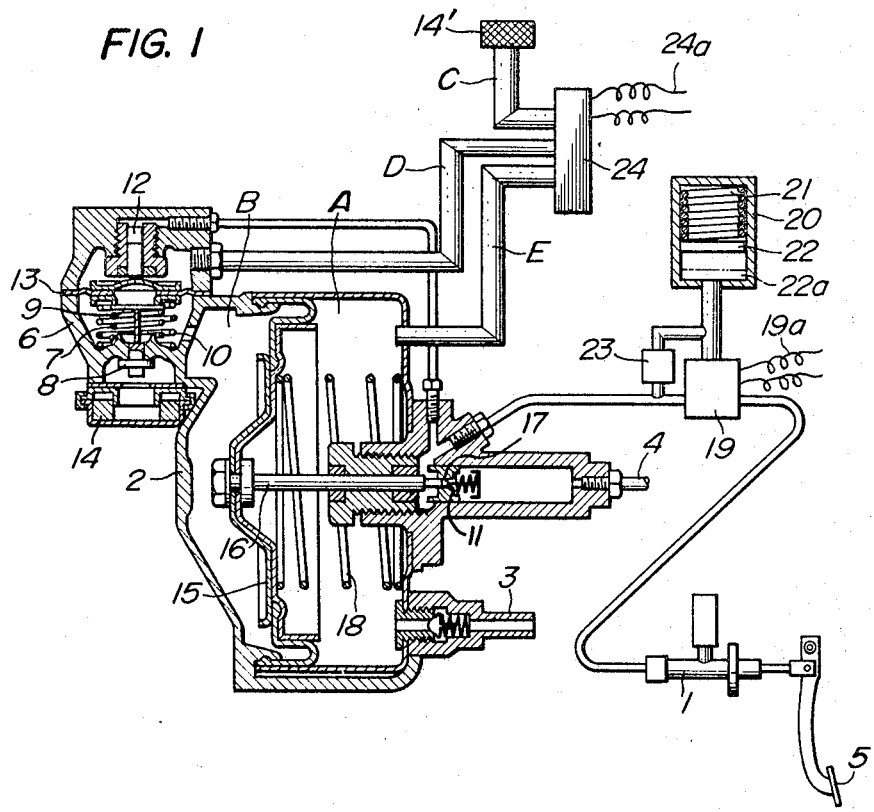
FIG. 1 is a side elevation, partly in section, showing the construction of an antiskid apparatus embodying the present invention.

The present invention will now be described in detail with reference to the accompanying drawings in which the same numerals designate similar parts.

First of all, an operation of the conventional vacuum-type hydraulic brake pressure boaster will be explained wtih reference to FIGS. 3 and 4. In the figures, reference numeral 1 designates a master cylinder, 2 designates a vacuum-type hydraulic brake pressure booster, 3 designates a negative pressure detecting tube connected to the suction pipe of the engine of an associated automotive vehicle and 4 designates a hydraulic fluid supply conduit connected to the wheel cylinders. When a brake pedal 5 is not actuated, an air valve 8 in a control valve assembly 6 is held in a closed position by virtue of a spring 7 in the control valve assembly, and a vacuum valve 9 in an open position by virtue of a spring 10, as shown in FIG. 3. However, when the brake pedal 5 is stepped lightly, as shown in FIG. 4, the hydraulic fluid pressure developed in the master cylinder 1 is introduced into the wheel cylinders through a hydraulic valve 11 and the hydraulic pressure supply conduit 4. In this case, the vacuum-type hydraulic brake pressure booster 2 is held inoperative and accordingly the brake force actng on the wheel cylinders is the same as that which is to be derived by a hydraulic brake apparatus of the type which is not provided with the vacuum-type hydraulic brake pressure booster 2. When the hydraulic pressure developed in the master cylinder 1 has reached a value above a predetermined level, e.g., 5 kilograms per square centimeter, the hydraulic pressure acting on a valve cylinder piston 12 in the control valve assembly 6 overcomes the biasing force of the spring 10 and causes a diaphragm 13 to closely contact vacuum valve 9, so that the communication between chambers A and B in the vacuum-type hydraulic brake pressure booster 2 is interrupted. Successively thereafter, the hydraulic pressure acting on the piston 12 compresses the spring 7 to open the air valve 8, whereby the atmospheric pressure is introduced into the chamber B through an air cleaner 14. As a result, a pressure differential is produced between the chamber A which is held at a negative pressure by the suction of air by the engine and the chamber B which is held at the atmospheric pressure, and thus a diaphragm 15 in said vacuum-type hydraulic brake pressure booster 2 is displaced towards the chamber A. By the displacement of the diaphragm 15, a piston rod 16 having one end mechanically connected to said diaphragm is urged in the same direction, pushing a hydraulic piston 17 and closing the hydraulic valve 11, so that a hydraulic pressure is built up in the wheel cylinder. Upon removing the pressure from the brake pedal 5, the hydraulic pressure in the master cylinder 1 drops and the piston 12 is returned to its original position under the bias of the spring 10 and the air valve 8 is also returned to its closing position under the bias of the spring 7. At the same time, the diaphragm 13 is disengaged from the vacuum valve 8 and thereby a negative pressure appears in both the chambers A and B with no pressure differential therebetween. The hydraulic piston 17, therefore, is caused to return to its original position by the biasing force of a return spring 18 and thus the entire vacuum-type hydraulic brake pressure booster 2 again assumes the position shown in FIG. 3.

Figure 5:
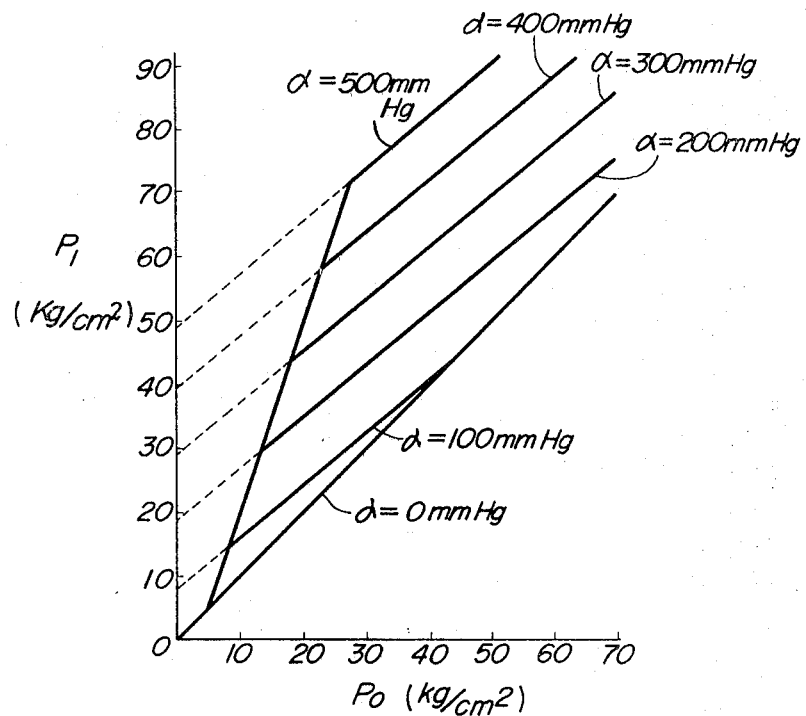
FIG. 5 is a chart graphically illustrating the operational characteristics of the conventional vacuum-type hydraulic brake pressure booster and the antiskid apparatus according to this invention.

In FIG. 5, there is shown a chart graphically illustrating the operational characteristics of the vacuum-type hydraulic brake pressure booster 2, in which the pressure differential $a$ between the negative pressure in the negative pressure detecting tube 3 and the atmospheric pressure, is used as a parameter. In the chart, the axis of the ordinate is scaled by the hydraulic pressure $P_1$ in the wheel cylinders and the axis of the abscissa by the hydraulic pressure $P_0$ in the master cylinder. As represented by the solid lines in the chart, the hydraulic pressure $P_1$ in the wheel cylinders, in the case of a hydraulic brake apparatus provided wtih the vacuum-type hydraulic brake pressure booster, increases with the pressure differential $a$ between the negative pressure in the negative pressure detecting tube 3 and the atmospheric pressure or with the negative pressure in the suction pipe for the engine, even when the hydraulic pressure $P_0$ in the master cylinder is maintained constant, and therefore an excellent braking efficiency can be obtained during running of the automotive vehicle at a high speed.

Now, preferred embodiments of the present invention will be described with reference to FIGS. 1 and 2. According to the present invention, as shown in FIG. 1, a solenoid-operated changeover valve 19 is disposed in a hydraulic pressure supply conduit connecting the master cylinder 1 with the vacuum-type hydraulic brake pressure booster 2. This solenoid-operated changeover valve 19 operates in such a way that it connects the master cylinder 1 with the vacuum-type hydraulic brake pressure booster 2 while shutting a hydraulic fluid supply conduit extending therefrom to a release cylinder 20, in the deenergized state of a solenoid 19$a$, whereas it connects the vacuum-type hydraulic brake pressure booster 2 with the release cylinder 20 while shutting the hydraulic pressure supply conduit between it and master cylinder 1, in the energized state of the solenoid 19$a$. The release cylinder 20 in communication with the solenoid-operated changeover valve 19 serves to relieve the hydraulic pressure in the vacuum-type hydraulic brake pressure booster 2, particularly the hydraulic pressure acting on the piston 12, upon actuation of the solenoid-operated changeover valve 19. A piston 22 in the release cylinder 20 is biased by a return spring 21 which is of relatively small compressive force. Reference numeral 23 designates a check valve which is provided to permit the hydraulic pressure in the release cylinder 20 to be released only into the vacuum-type hydraulic brake pressure booster 2. Another solenoid-operated changeover valve 24 is provided which is operative in such a way that it communicates air pressure supply conduits D and E with each other while closing an air pressure supply conduit C communicating with the atmosphere, in the deenergized state of a solenoid 24$a$, whereas it communicates the air pressure supply conduits C and D with each other while closing the air pressure supply conduit E, in the energized state of solenoid 24$a$. The air pressure supply conduit C is provided at its open end with an air filter 14' so as to prevent dust from entering the solenoid-operated changeover valve 24. The construction of the portions of the antiskid apparatus other than those mentioned above is the same as that of the conventional vacuum-type hydraulic brake pressure booster.

Figure 2:
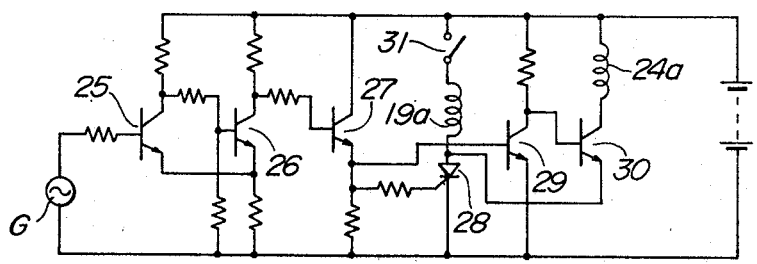
FIG. 2 is an electrical connection diagram showing the electrical control section in the antiskid apparatus shown in FIG. 1.

FIG. 2 shows the electrical connection diagram of the electrical control section in the apparatus shown in FIG. 1. The electric circuit of the electrical control section consists of a wheel deceleration detector G mounted on one of the wheels of the automotive vehicle, transistors 25 and 26 composing a Schmitt trigger circuit, a transistor 27 for energizing a thyristor 28 to thereby conduct a current through the solenoid 19$a$ of the solenoid-operated changeover valve 19, a phase inverting transistor 29 for energizing a transistor 30 which supplies a current to the solenoid 24$a$ of the solenoid-operated changeover valve 24 therethrough, and a switch 31 provided on the brake pedal 5 shown in FIG. 1, the switch being closed upon actuation of the brake pedal and opened when the pressure is removed from the brake pedal.

The antiskid apparatus of the present invention having a construction as described hereinabove operates in the following manner: First of all, when a brake force is applied to the wheel to stop the vehicle body but the wheel is not locked, the output voltage of the wheel deceleration detector G is relatively small and the transistor 25 is not energized. Accordingly, the thyristor 28 is held in a deenergized state, with no current flowing through the solenoids 19$a$ and 24$a$ of the respective solenoid-operated changeover valves 19 and 24 and therefore both of the solenoid-operated changeover valves are held in an inoperative position. In this state, the vacuum-type hydraulic brake pressure booster 2 performs only the hydraulic brake pressure boosting action in the same manner in a conventional device.

Now, when the wheel is about to be locked during the operation of the vacuum-type hydraulic brake pressure booster 2, a high output voltage is produced by the wheel deceleration detector G, energizing the transistor 25, and as a result, the thyristor 28 is energized actuating the solenoid-operative changeover valve 19. In this case, the switch 31 is of course held in a closed position. On the other hand, the transistor 29 remains in an energized state and therefore the transistor 30 is deenergized holding the solenoid-operated changeover valve 24 in its inoperative position. Upon actuation of the solenoid-operated changeover valve 19 in the manner described, with the solenoid-operated changeover valve 24 remaining inoperative, the hydraulic pressure acting on the valve cylinder piston 12 in the valve assembly 6 is relieved into the release cylinder 20 through said solenoid-operated changeover valve 19 and thus the valve cylinder piston 12 is subjected to substantially no pressure. Accordingly, the control valve 6 is brought into a state similar to that in the case when the brake pedal 5 is not stepped on or is stepped just lightly, with the air valve 8 closed and the vacuum valve 9 opened. The chambers A and B are communicated with each other and a negative pressure appears in both of chambers, with the result that the pressure previously urging the piston rod 16 is eliminated, and piston rod 16 and hydraulic piston 17 are returned to their original positions under the bias of the return spring 18. As a result, the hydraulic valve 11 is reopened permitting the hydraulic fluid in the wheel cylinder to flow into the release cylinder 20 through the hydraulic pressure supplying conduit 4 and the solenoid-operated changeover valve 19, and thereby the hydraulic pressure in the wheel cylinder is reduced to substantially zero. When the deceleration of the wheel drops below a definite value, the transistor 25 is deenergized due to the droppage of the output voltage of the wheel deceleration detector G and both of the solenoid-operated changeover valves 19 and 24 are actuated. Upon actuation of the solenoid-operated changeover valves 19 and 24, the atmospheric pressure is introduced into the chamber B through the air pressure supply conduits C and D, producing a pressure differential between the chambers A and B. Therefore, the diaphragm 15 is caused to displace towards the chamber A, urging the piston rod 16 in the same direction, which piston rod, in turn pushes the hydraulic piston 17 while closing the hydraulic valve 11. As a result, the hydraulic pressure is again built up in the wheel cylinder. In this case, however, since substantially no hydraulic pressure is acting on the valve cylinder piston 12, the vacuum-type hydraulic brake pressure booster 2 does not act to build up the hydraulic pressure in the wheel cylinder, the value of the hydraulic pressure in the wheel cylinder being determined solely by the pressure differential between the chambers A and B, independently of the hydraulic pressure in the master cylinder 1. When, for example, the vacuum-type hydraulic brake pressure booster operates following the operational characteristics represented by the solid lines in the chart of FIG. 5, the highest hydraulic pressure in the wheel cylinder after the antiskid apparatus is set in operation drops as indicated by the respective dotted lines on the extension of the respective solid lines and reaches a value at the intersection between the solid line and the axis of ordinate where the hydraulic pressure in the master cylinder is zero. As an example, the hydraulic pressure in the wheel cylinders in this case is 49 kilograms per square centimeter when the pressure differential a between the chambers A and B is 500 mm. Hg and is 40 kilograms per square centimeter when the pressure differential is 400 mm. Hg. As the hydraulic pressure in the wheel cylinders increases and when the wheel is about to be locked again, the wheel deceleration detector generates a high output voltage and thereby the solenoid-operated changeover valve 19 is brought into the energized state and the solenoid-operated changeover valve 24 into the deenergized state. In this case, since the hydraulic pressure on the valve cylinder piston 12 has already been eliminated, a negative pressure appears in both the chambers A and B, and thus the hydraulic pressure in the wheel cylinders starts to drop again. The above-described operation is repeated until the vehicle is brought to a halt and upon completion of the braking operation, a pressure is removed from the brake pedal 5, whereupon the switch 31 is opened and the thyristor 28 is deenergized, following which the solenoid-operated changeover valves 19 and 24 are deenergized. Thereafter, the vacuum-type hydraulic brake pressure booster 2 operates in the same manner as the conventional brake apparatus, in communication with the master cylinder 1. The hydraulic pressure built up in the release cylinder 20, which is low as about 1 to 5 kilograms per square centimeter, is relieved into the master cylinder 1 through the check valve 23 and the piston 22 in said release cylinder is returned to a position indicated at 22a, shown in FIG. 1, under the bias of the return spring 21.

Figures 6, 7:
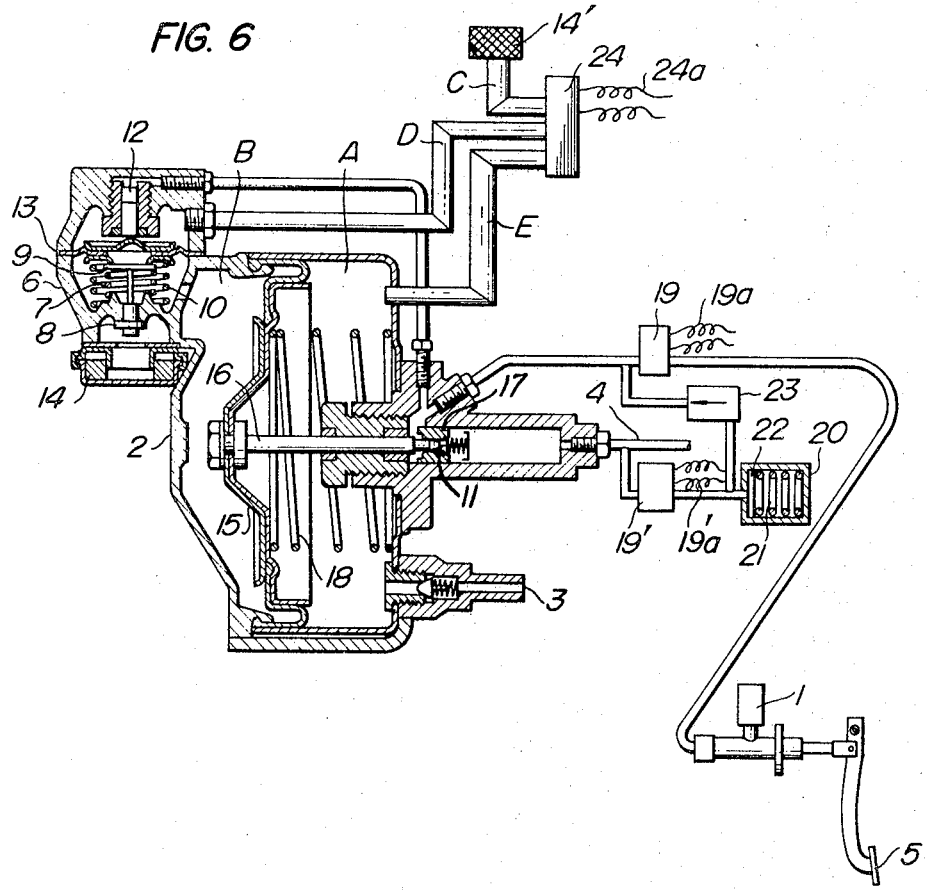
FIG. 6 is a side elevatioal view, partly in section, showing another form of the antiskid apparatus of this invention.
FIG. 7 is an electrical connection diagram showing the electrical control section in the antiskid apparatus shown in FIG. 6.

Next, another embodiment of the present invention will be described with reference to FIGS. 6 and 7. In this embodiment, the solenoid-operated changeover valve 19 is operative in such a way that it establishes the communication between the master cylinder 1 and the vacuum-type hydraulic brake pressure booster 2 in the deenergized state of the solenoid 19a and interrupts said communication in the energized state of said solenoid. Another solenoid-operated changeover valve 19' is operative in the same manner as the solenoid-operated changeover valve 19, namely it establishes the communication between the release cylinder 20 and the hydraulic pressure supply conduit 4 connecting the master cylinder with the solenoid-operated changeover valve in the deenergized state of the solenoid 19'a, and interrupts said communication in the energized state of said solenoid. The release cylinder 20 serves, in the deenergized state of the solenoid-operated changeover valve 19, to receive the hydraulic fluid in the wheel cylinder and thereby to reduce the hydraulic pressure in the wheel cylinder to substantially zero. In the release cylinder 20 is disposed a return spring 21 to return the piston 22 in the release cylinder to the extreme left-hand position. A solenoid-operated changeover valve 24 is provided which is adapted to operate in such a way that it communicates the air pressure supply conduits D and E with each other while closing the air pressure supply conduit in communication with the atmosphere, in the deenergized state of the solenoid 24a, whereas it communicates the air pressure supply conduits C and D with each other while closing the air pressure supply conduit E, in the energized state of said solenoid. The air pressure supply conduit C is provided at its open end with the air filter 14' so as to prevent the instrusion of dust into the solenoid-operated changeover valve 24. The check valve 23 is provided to permit the hydraulic fluid in the release cylinder to flow in one direction into the hydraulic pressure supply conduit extending from the solenoid-operated changeover valve 24 to the vacuum-type hydraulic brake pressure booster 2. The rest of the construction of the apparatus is the same as the conventional vacuum-type hydraulic brake pressure booster.

The electrical connection diagram of the electrical control section in the apparatus described above is shown in FIG. 7. As shown, the electric circuit consists of the wheel deceleration detector G mounted on one of the wheels of the automotive vehicle, transistors 25 and 26 composing a Schmitt trigger circuit, a phase inverting transistor 29 for energizing transistors 30 and 32, transistor 30 being provided for conducting a current therethrough to the solenoid 24a of the solenoid-operated changeover valve 24 and transistor 32 being provided for conducting a current therethrough to the solenoid 19'a of the solenoid-operated changeover valve 19' and supplying a gate signal to the thyristor 28 through which a current is conducted to the solenoid 19a of the solenoid-operated changeover valve 19, and a brake switch 31' which is adapted to be closed when the brake pedal 5 shown in FIG. 6 is actuated and is opened when the pressure is removed from said brake pedal.

The apparatus of this embodiment constructed as described above operates in the following manner. Namely, when a brake force is applied to the wheel to stop the vehicle body but without locking said wheel, the output voltage of the wheel deceleration detector G is small and the transistor 29 remains in its deenergized position. In this case, the brake switch 31' is of course in the closed position and therefore the transistor 32 is in the energized state conducting a current to the solenoid 19'a of the solenoid-operated changeover valve 19' to keep valve 19' in the actuated position. On the other hand, the thyristor 28 is held inactive supplying no current to the solenoids 19a and 24a, so that the solenoid-operated changeover valves 19 and 24 are deenergized. Under such condition, therefore, the master cylinder 1 is in communication with the vacuum-type hydrauldic brake pressure booster 2 but the communication between the hydraulic pressure supply conduit 4 and the release cylinder 20 is interrupted. On the other hand, the air pressure supply conduits D and E are communicated with each other but the air pressure supply conduit C in communication with the atmosphere is closed. Consequently, the vacuum-type hydraulic brake pressure booster 2 performs only the double braking operation in exactly the same manner as the conventional apparatus as described previously.

Now, when the wheel is about to be locked during the braking operation of the vacuum-type hydraulic brake pressure booster 2, the output voltage of the wheel deceleration detector G becomes so high as to shift the transistor 29 from the deenergized state to the energized state. Therefore, the transistors 30 and 32 are deenergized and the thyristor 28 is energized, with the result that the solenoid-operated changeover valves 19' and 24 are deenergized and the solenoid-operated changeover valve 19 is energized, interrupting the communication between the master cylinder 1 and the vacuum-type hydraulic brake pressure booster 2 and establishing communication between the hydraulic pressure supply conduit 4 and the release cylinder 20. On the other hand, the air pressure supplying conduits D and E are communicated with each other and the air pressure supply conduit C is closed. Therefore, the hydraulic fluid in the wheel cylinders is released into the release cylinder 20 through the solenoid-operated changeover valve 19' until the hydraulic pressure in wheel cylinders becomes substantially zero. The lowering of the hydraulic pressure in the wheel cylinders causes the hydraulic valve 11 to open, so that the hydraulic pressure acting on the valve cylinder piston 12 is also released into the release cylinder 20 through said hydraulic valve 11 and the solenoid-operated changeover valve 19', whereby valve cylinder piston 12 undergoes substantially no pressure. The control valve 6 is allowed to assume a state similar to that in the case when the brake pedal 5 is not stepped or is stepped just lightly, and a negative pressure appears in both the chambers A and B with no pressure differential between the chambers. The diaphragm 15, therefore, is urged towards the chamber B and returns to its original position under the bias of the return spring 18. After the hydraulic pressure in the wheel cylinders has been relieved in the manner described above, the rate of rotation of the wheel increases again and the output voltage of the wheel deceleration detector G decreases, causing the transistor 29 to return to its deenergized state from the energized state, and thereby the solenoid-operated changeover valves 24, 19 and 19' are all placed in their actuated positions. As a result, the air pressure supply conduits C and D are communicated with each other and the air pressure supply conduit E is shut down, so that the atmospheric pressure appears in the chamber B and a negative pressure in the chamber A, with a large pressure differential therebetween. The piston rod 16 is urged towards the chamber A by the displacement of the diaphragm 15, whereby the hydraulic valve 11 is closed and at the same time the hydraulic piston 17 is pushed by piston rod 16, building up a hydraulic pressure again in the wheel cylinders. In this case, however, since the valve cylinder piston 12 is subjected to substantially no hydraulic pressure, the value of the hydraulic pressure in the wheel cylinder is determined solely by the pressure differential between the negative pressure in the chamber A and the atmospheric pressure in the chamber B, independently of the hydraulic pressure in the master cylinder. When the vacuum-type hydraulic brake pressure booster 2 operates in accordance with, e.g., the operational characteristics represented by the solid lines in the chart of FIG. 5, the highest hydraulic pressure in the wheel cylinders after the antiskid apparatus has been set in hydraulic pressure control operation drops as indicated by the dotted lines on the extension of the respective solid lines and reaches a value at the intersection of the respective dotted lines with the axis of ordinate where the hydraulic pressure $P_0$ in the master cylinder is zero. As an example, the hydraulic pressure in the wheel cylinders in this case is 49 kilograms per square centimeter when the pressure differential $a$ between the chambers A and B is 500 mm. Hg. and is 40 kilograms per square centimeter when the pressure differential is 400 mm. Hg. As the hydraulic pressure in the wheel cylinders increases and when the wheel is about to be locked again, the wheel deceleration detector G produces a high output voltage and thereby the transistor 29 is energized placing the solenoid-operated changeover valve 19 in its actuated position and the solenoid-operated changeover valves 19' and 24 in their inoperative positions. By the deenergized state of the solenoid-operated changeover valve 24, the pressure having been exerted on the piston rod 16 is eliminated and the hydraulic valve 11 is opened, so that the hydraulic pressure in the wheel cylinders drops to zero again. At the same time, the diaphragm 15 displaces towards the chamber B and returns to its original position under the bias of the return spring 18. On the other hand, when the hydraulic pressure control is in effect for the antiskid operation, the release cylinder 20 for relieving the hydraulic pressure in the wheel cylinders is in communication with the hydraulic pressure supply conduit 4 which communicates the vacuum-type hydraulic brake pressure booster 2 directly with said wheel cylinders, and therefore the hydraulic pressure in the wheel cylinders can be relieved in a very short time. This is particularly advantageous in braking the automotive vehicle during running on a slippery road surface such as a frozen road surface, and enables the time delay caused by the mechanical operation of the release cylinder 20 with respect to the electrical operation of the wheel deceleration detector G to be shortened, namely the time interval of the instantaneous locking of the wheel is shortened.

The above-described operation is repeated until the vehicle body is stopped. Upon removing the pressure from the brake pedal 5, the solenoid-operated changeover valves 19, 19' and 24 are all brought into the deenergized state and thereafter the vacuum-type hydraulic brake pressure booster 2 operates in the same manner as the conventional vacuum-type hydraulic brake pressure booster. The hydraulic pressure developed in the relay cylinder 20, which is in the range from 1 to 5 kilograms per square centimeter, is returned into the master cylinder 1 through the check valve 23 and the solenoid-operated changeover valve 19, and thus a series of the operation of the antiskid apparatus is completed.

Although in the embodiments described and illustrated herein, the control of the air pressure in the vacuum-type hydraulic brake pressure booster 2, during the hydraulic pressure control operation for the antiskid action, is effected by changing the communication among the air pressure supply conduits C, D and E by the solenoid-operated changeover valve 24, the same may be achieved by means of the electromagnetic force of an electromagnet which is provided in the valve control assembly 6 and adapted to operate the valve cylinder piston 12 in said valve control assembly in response to the output voltage of the wheel deceleration detector G. In other words, the air pressure control in the vacuum-type hydraulic brake pressure booster 2, during the hydraulic pressure control operation for the antiskid action, can be satisfactorily effected by means either of the electromagnet or the solenoid-operated changeover valve 24, and both means are the same insofar as the electromagnetic force of an electromagnet is used which is energized in response to the output of the wheel deceleration detector G.

As will be understood from the foregoing description, according to the present invention which comprises the vacuum-type hydraulic brake pressure booster operative with the air pressure therein controlled by the hydraulic pressure developed in the master cylinder and the electromagnetic force of the electromagnet, a wheel deceleration detector adapted to produce an output voltage to energize said electromagnet in response thereto, the release cylinder disposed in the hydraulic pressure supply conduit connecting said vacuum-type hydraulic brake pressure booster directly to the wheel cylinders, and solenoid-operated changeover valves disposed in the hydraulic pressure supply conduit between the vacuum-type hydraulic brake pressure booster and the master cylinder and the hydraulic pressure supply conduit between the release cylinder and the first hydraulic pressure supply conduit respectively and actuated in response to the output of the wheel deceleration detector, there is produced a marked effect that the hydraulic brake pressure amplifying operation of the vacuum-type hydraulic brake pressure booster and the hydraulic pressure control for the antiskid action can be effected with a single vacuum servo means. This is advantageous not only in reducing the cost of the antiskid apparatus but also in reducing the weight of the system to be mounted in an automotive vehicle, with the consequent improvement in the high speed performance of the automotive vehicle. Furthermore, according to the present invention, since the release cylinder is disposed in the hydraulic pressure supply conduit which is connected directly with the wheel cylinders, as described above, the time required for releasing the hydraulic pressure in the wheel cylinders can be shortened drastically and thereby the time interval for the instantaneous locking of the wheel in the braking operation of the automotive vehicle travelling on a slippery road surface can be shortened compared with the conventional apparatus, providing for stable steering the automotive vehicle.

We claim:
1. An antiskid hydraulic actuator for the hydraulic braking system of a vehicle powered by an engine and having a master cylinder and a plurality of wheel cylinders comprising
   a vacuum pressure changeover solenoid valve,
   a hydraulic pressure booster for boosting hydraulic braking pressure by means of vacuum pressure in the engine having said vacuum pressure changeover solenoid valve arranged in a vacuum pressure circuit of said hydraulic pressure booster, so that the boosting capability of said booster may be given when said vacuum pressure changeover solenoid valve is in a first position and said boosting capability may be lost when said vacuum pressure changeover solenoid valve is in a second position, and
   release cylinder means arranged in a portion of a hydraulic braking pressure supply conduit connecting said master cylinder to said pressure booster for reducing the hydraulic pressure in said wheel cylinders when said changeover solenoid valve is in said second position, said cylinder means including a second solenoid valve, a piston within said release cylinder means which is moved to reduce the hydraulic pressure in said wheel cylinders substantially to zero by operating said second solenoid valve while a hydraulic pressure circuit is shut off between said release cylinder means and said hydraulic braking pressure suply conduit by closing said second solenoid valve attached to said release cylinder means, and a check valve arranged between said release cylinder means and said hydraulic pressure supply conduit to let the hydraulic pressure remaining in said release cylinder means escape into said hydraulic pressure supply conduit through said check valve.

2. An antiskid hydraulic actuator as in claim 1 wherein said second solenoid valve consists of a three-way valve so that a hydraulic pressure circuit is established between said master cylinder and said hydraulic pressure booster and, simultaneously, a hydraulic pressure circuit is shut off between said release cylinder and said master cylinder when said solenoid valve is not energized, while a hydraulic pressure circuit is established between said release cylinder and said hydraulic pressure booster and shut off between said release cylinder and said master cylinder when said solenoid valve is energized.

3. An antiskid hydraulic actuator as in claim 1 wherein said release cylinder means includes a third solenoid valve attached to said release cylinder means and arranged in a hydraulic pressure circuit between said release cylinder means and said hydraulic pressure circuit to said wheel cylinders so that said hydraulic pressure circuit may be shut off when said third solenoid valve is energized, and opened when said third solenoid valve is deenergized.

References Cited
UNITED STATES PATENTS

| 3,260,556 | 7/1966 | Packer. |
| 3,330,113 | 7/1967 | Perrino. |
| 3,402,973 | 9/1968 | Scibbe. |

DUANE A. REGER, Primary Examiner

U.S. Cl. X.R.
60—54.5